May 2, 1939.                J. H. VAN UUM                 2,156,669
             SPRING CLIP RETAINING DEVICE FOR BEAD TRIM
                  Filed June 18, 1936          2 Sheets-Sheet 1

INVENTOR.
John H Van Uum
BY
Justin W Macklin
ATTORNEY.

May 2, 1939.  J. H. VAN UUM  2,156,669

SPRING CLIP-RETAINING DEVICE FOR BEAD TRIM

Filed June 18, 1936   2 Sheets-Sheet 2

INVENTOR.
John H. Van Uum
BY
ATTORNEY.

Patented May 2, 1939

2,156,669

UNITED STATES PATENT OFFICE 2,156,669

SPRING CLIP RETAINING DEVICE FOR BEAD TRIM

John H. Van Uum, Lakewood, Ohio

Application June 18, 1936, Serial No. 85,891

2 Claims. (Cl. 24—213)

This invention relates to retaining clip devices for securing channel bead trim and the like to automobile bodies, fenders, metal furniture and the like, and has for an object the provision of a simple, efficient, retaining clip capable of being cheaply manufactured and particularly adapted for use with certain forms of channel bead trim having inturned flanges and desired to be very rigidly retained in position.

If devices of this nature tightly fit within the trim, registration of the securing device or spring clips with their respective openings is frequently difficult. Wherefore it is an object of this invention to provide a clip which may be placed into the slot-like opening at the inner side of the trim strip and which shall thereafter firmly grip or engage the interior of the trim, but allowing for placement of the securing clips in predetermined positions.

A further desirable characteristic is to so construct such a clip that while firmly maintaining its engagement with the trim it may be capable of longitudinal movement to provide for alignment with the perforations or openings in the members to which the bead is to be secured.

A further specific object is to so shape the head of the retaining member that it may be conveniently formed at two ends of a single flat strip of metal and fit the inside of the channel so that pressure on the channel will cause the loop of the clip to pass through the retaining or anchoring opening in the element to which the bead is to be secured. An advantage of the complementary contour of the head portion of the retaining member and the interior convex surface of the channel is that, even though the retaining member requires considerable force to cause the shoulders on the loop to pass through and engage beneath the retaining member, the necessary pressure on the channel will not cause any distortion or irregularity in the smooth finish of the surface of the bead trim.

Other objects will become apparent in the following description which relates to the accompanying drawings.

Figure 1:
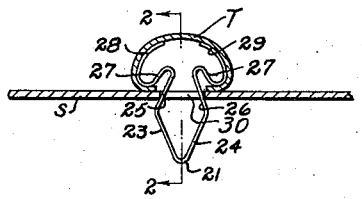
Fig. 1 is a sectional view through a channel member showing my retainer clip in position.
Figure 2:
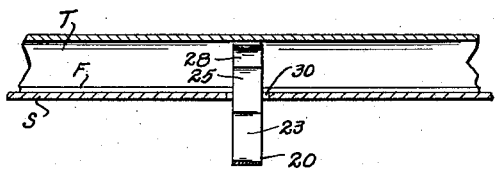
Fig. 2 is a longitudinal section of the same showing the retainer clip in elevation, the plane of the section being indicated by the line 2—2 of Fig. 1.
Figure 3:
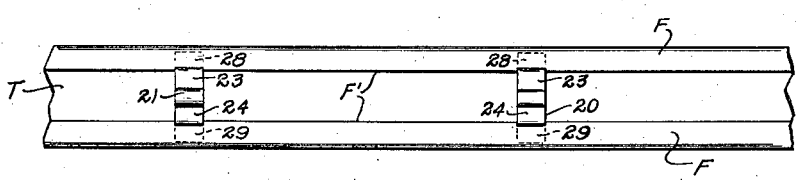
Fig. 3 is a bottom plan view of the channel showing a plurality of retainer clips in position.
Figure 4:
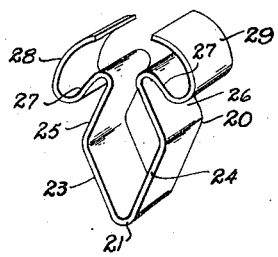
Fig. 4 is an enlarged perspective view of the retaining member illustrated in Fig. 1.

Trim for various uses such as beading for interior decoration, for metal furniture, and for use in trim for automobile bodies, requires to be very firmly held in place and usually comprises a channel having a partially opened side or slot at which terminate inturned flanges forming the edges of the strip from which it is formed and is usually of the form approximately such as shown in the drawings.

Referring to the drawings by the use of reference characters, T indicates a bead trim strip of hollow rolled metal stock, of the usual form, comprising a convex body portion having spaced inturned flanges F adapted to fit against supporting members S which form a part of the automobile body, hood or part of metal furniture or the like to which the trim strip is to be secured. The receiving or supporting member S is provided with spaced perforations and spring clips 20 having aperture engaging portions embraced by the inturned flanges of the channel or trim strip.

In the present case, as above indicated, I have provided such a clip made from a single strip of uniform width of spring metal and is capable of being inserted into the open or under side of the trim at any point along its length, the clip being provided with an aperture engaging portion projecting substantially at right angles to the trim.

The retaining clip member is designated generally 20 and comprises a single integral flat strip of metal formed from spring steel or a like material. The strip is bent as at 21 forming a nose portion intermediate its ends, and then extends upwardly or outwardly away from the nose portion 21 forming leg portions as at 23 and 24 and then extends inwardly forming the leg portions indicated at 25 and 26, comprising substantially a diamond-shaped loop portion. The strip is then bent downward forming intermediate portions as at 27, a predetermined distance to contact the flange member F of the trim strip T, and then bent upwardly to form the head portions 28 and 29.

It will be seen that the arcuately shaped head portions 28 and 29 are of a shape to be complementary to the interior of the trim strip. The retaining clip members are inserted into the opening F' of the trim strip T and are of such width that they may be freely passed therethrough and thereafter be turned at right angles to securely hold the clips in place. It will be noted that the tension of the portions 27 and the head members 28 and 29 cooperate to firmly hold the device in position in the trim member. However, the clips are capable of being moved longitudinally manually by compressing the clip device in order that they may be registered with and passed through the openings 30 in the supporting member S, while the leg members 25 and 26 press outwardly beneath the edges of the openings 30, causing constant downward tension by reason of which the trim member is firmly secured to the supporting member.

Figure 5:
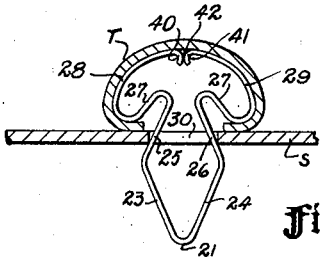
Fig. 5 is a sectional view similar to Fig. 1, showing a modified form of retaining clip for securing the bead trim to a supporting member.
Figure 6:
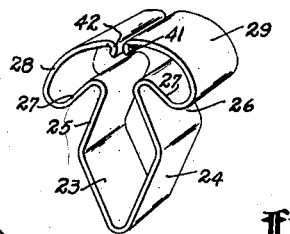
Fig. 6 is a perspective view of the retaining device illustrated in Fig. 5.

In the modified forms of my retaining spring clip illustrated in Figs. 5 and 6, the device is formed in the same manner as the device illustrated in Fig. 1, but the arcuately shaped head portions 28 and 29 are extended and terminate in inturned end portions 40 and 41 respectively.

It will be noted that the end portions 28 and 29 are normally separated (Fig. 6) but are capable of being brought together, and abut as at 42, when the device is placed in the trim strip T but due to the fact that the edges of the end portions are inturned, the head portions 28 and 29 are prevented from overlapping when placed in position.

Figure 7:
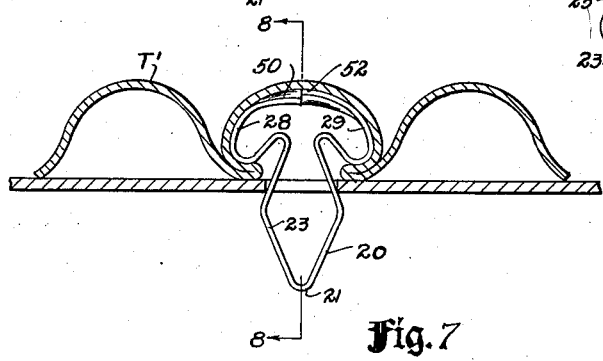
Fig. 7 is a sectional view of still another modified form of retaining device used with a modified form of bead trim.
Figure 8:
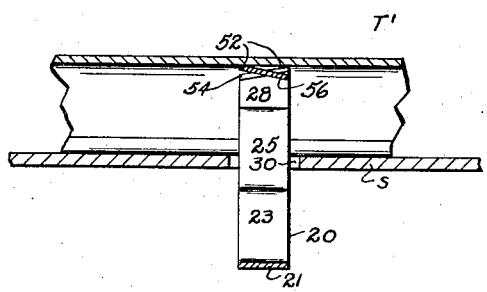
Fig. 8 is a longitudinal sectional view of the same showing the clip in elevation, the plane of the section being indicated by the line 8—8 of Fig. 7.
Figure 9:
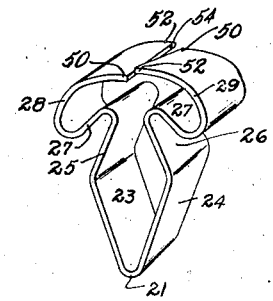
Fig. 9 is a perspective view of the retaining device illustrated in Figs. 7 and 8.

The modified form of my retainer clip illustrated in Figs. 7, 8, and 9, shows still another manner in which the overlapping of the end portions is prevented when the device is placed in position. In this form opposite corners of the end portions are bent downwardly as at 50, and the other corners bent upwardly as at 52 to provide oppositely inclined meeting edges 54 and 56 (Fig. 8) to produce abutting surfaces to prevent the overlapping of the end portions or edges.

The oppositely positioned raised corners 52 and the arcuately shaped head portions 28 and 29 contact the entire inner surface of the trim member T' as illustrated in Figs. 7 and 8 to grip and securely maintain the retaining clip in position.

It will be noted that the leg members 25 and 26 of the retaining spring clips illustrated in Figs. 5 to 9 inclusive, exert more outward pressure upon the openings 30 and the head portions 28 and 29 are more securely held in place than the open end spring clip, due to the fact that the device is so designed that the end portions are adapted to be brought together and abut when placed in a trim member, producing in effect a continuous loop spring clip having a continuous nose and head portions.

The gripping action of the legs and head members of the devices illustrated in the drawings, is so effective that the bead trim may be made straight and be bent around the curved portions of an automobile body or the like and gripped as it is bent by registration of the clips with their respective openings. The gripping or retaining action of these clips is sufficient to not only firmly hold the channel trim against inadvertent movement, but also to prevent its removal, except by compression of the clip from the opposite side of the supporting member.

It will be seen from the foregoing description that I have provided a retaining spring clip device which is stamped from flat sheet material without wasting any of the material. The flat strip may be conveniently bent by suitable tools to the finished form shown in the accompanying drawings, with high production tools and with corresponding cheapness of manufacture.

Having thus described my invention, what I claim is:

1. A spring fastener for securing a member to a support having an opening and comprising a strip of spring metal having end portions in the form of separate head portions adapted for connection to the member and extending toward each other at their free ends, the free extremities of said head portions being oppositely inclined, said extremities of said head being so related to each other as to come into an abutting intersecting relationship with each other when the fastener is installed, and said strip of metal having a portion between the ends in the form of a diamond-shaped loop adapted to enter and engage an opening in the support for securing the fastener thereto.

2. A spring fastener for securing a member to a support and comprising a single flat strip of spring metal having a portion between its ends in the form of a loop adapted to enter an opening in said support and having end portions in the form of head portions which are concave toward each other, the free ends of said head portions being distorted oppositely with respect to each other for increasing the effective size thereof in a direction normal to the face of the strip, and said free end portions being in abutting relationship at the ends when the clip is installed.

JOHN H. VAN UUM.